United States Patent
Liao et al.

(10) Patent No.: US 9,237,326 B2
(45) Date of Patent: Jan. 12, 2016

(54) IMAGING SYSTEM AND METHOD

(75) Inventors: Chao Kang Liao, New Taipei (TW); Chi Hao Wu, Taipei (TW)

(73) Assignee: IMEC Taiwan Co., Hsinchu (TW)

(*) Notice: Subject to any disclaimer, the term of this patent is extended or adjusted under 35 U.S.C. 154(b) by 678 days.

(21) Appl. No.: 13/535,101

(22) Filed: Jun. 27, 2012

(65) Prior Publication Data

US 2014/0002605 A1    Jan. 2, 2014

(51) Int. Cl.
| | |
|---|---|
| H04N 13/02 | (2006.01) |
| H04N 13/00 | (2006.01) |
| G06T 5/00 | (2006.01) |
| G06T 5/50 | (2006.01) |
| G06T 7/00 | (2006.01) |

(52) U.S. Cl.
CPC ........... *H04N 13/0022* (2013.01); *G06T 5/005* (2013.01); *G06T 5/50* (2013.01); *G06T 7/0075* (2013.01); *G06T 2207/10012* (2013.01); *G06T 2207/20012* (2013.01); *H04N 2013/0081* (2013.01); *H04N 2013/0092* (2013.01)

(58) Field of Classification Search
CPC .............. H04N 13/02; H04N 13/0022; H04N 2013/0081; H04N 2013/0092; G06K 9/48; G06T 2207/10012; G06T 2207/20012; G06T 5/005; G06T 5/50; G06T 7/0075
See application file for complete search history.

(56) References Cited

U.S. PATENT DOCUMENTS

| | | | | |
|---|---|---|---|---|
| 5,909,251 | A * | 6/1999 | Guichard et al. | 348/416.1 |
| 6,269,175 | B1 * | 7/2001 | Hanna et al. | 382/107 |
| 8,160,391 | B1 * | 4/2012 | Zhu et al. | 382/284 |
| 8,315,426 | B2 * | 11/2012 | Yea et al. | 382/100 |
| 2006/0078180 | A1 * | 4/2006 | Berretty et al. | 382/128 |
| 2006/0082575 | A1 * | 4/2006 | Auberger et al. | 345/421 |
| 2006/0204040 | A1 * | 9/2006 | Freeman et al. | 382/107 |
| 2007/0122028 | A1 * | 5/2007 | Sun et al. | 382/154 |
| 2009/0067705 | A1 * | 3/2009 | Yu et al. | 382/154 |
| 2010/0231593 | A1 * | 9/2010 | Zhou et al. | 345/428 |
| 2011/0080464 | A1 * | 4/2011 | Alessandrini et al. | 348/42 |
| 2011/0176722 | A1 * | 7/2011 | Sizintsev et al. | 382/154 |
| 2012/0050485 | A1 * | 3/2012 | Thorpe et al. | 348/46 |
| 2012/0051624 | A1 * | 3/2012 | Ando | 382/154 |
| 2012/0163703 | A1 * | 6/2012 | Lim et al. | 382/154 |
| 2013/0076872 | A1 * | 3/2013 | Wang | 348/51 |
| 2013/0278719 | A1 * | 10/2013 | Rusert et al. | 348/43 |
| 2013/0322544 | A1 * | 12/2013 | Horlander | 375/240.16 |

\* cited by examiner

*Primary Examiner* — Christopher S Kelley
*Assistant Examiner* — Deirdre Beasley
(74) *Attorney, Agent, or Firm* — Knobbe Martens Olson & Bear LLP

(57) ABSTRACT

An imaging system and method are disclosed. In one aspect, the system includes an edge-detecting module detecting edge coordinates in a first image; first and second disparity-estimating modules respectively configured to obtain a first and second estimated disparity map, a cross-checking module configured to cross check the first estimated disparity map using the second estimated disparity map to identify occlusion pixels in the first estimated disparity map, an occlusion-refining module configured to refine the occlusion pixels by identifying at least a pixel under refinement on the first estimated disparity map as occluded based on the number of occlusion pixels in a refining base region, and a hole-filling module configured to fill the refined set of occlusion pixels. The imaging system improves the quality of a disparity map and controls the complexity of stereo-matching.

27 Claims, 14 Drawing Sheets

IMAGING SYSTEM AND METHOD

BACKGROUND OF THE INVENTION

1. Field of the Invention

The disclosed technology relates to the field of computer vision, and more particularly to an imaging system and method that generate a depth map.

2. Description of the Related Technology

Stereo-matching estimates disparity distances between corresponding pixels in a pair of stereo images or videos captured from parallel cameras in order to extract depth information of objects in a scene. Stereo-matching has many applications such as 3D gesture recognition, viewpoint synthesis, and stereoscopic TV.

In general, imaging methods that generate a depth map can be classified into two categories: global and local methods.

Global methods usually formulate the stereo-matching problem as an energy function with the objective to find a disparity function d that minimizes a global energy. The energy function may be expressed by the following equation.

$$E(d) = E_{data}(d) + \lambda E_{smooth}(d) \quad (1)$$

where $E_{data}(d)$ measures how well the disparity function d agrees with the stereo image pair, and $E_{smooth}(d)$ encodes the smoothness assumptions made by the method, and measures differences between neighboring pixels' disparities. Once the energy function is formulated, it may be minimized using, for example, dynamic programming, graph cuts and belief propagation.

Local methods estimate a disparity distance of a pixel independently over a window. Matching costs for the pixel in one of the stereo images and a candidate matching pixel in the other of the stereo images are aggregated over the window. The minimum matching cost among a plurality of candidate matching pixels with different disparity distances may be identified for selection of the disparity level of the pixel on a disparity map.

For both of the methods, there exists a tradeoff between depth map quality and computational complexity. For example, for global methods, the smoothness term $E_{smooth}(d)$ in the energy function may use a larger neighborhood such as a neighborhood of 8 instead of 2 in order to obtain better boundaries. However, the computational complexity for optimizing the global energy is approaching being intractable. For local methods, the complexity is much lower than that of the global methods but at the cost of quality. To enhance quality, a higher number of bits may be used to represent a pixel so as to obtain a finer disparity map. However, matching cost calculation and aggregation is performed on per-pixel basis. With the higher number of bits per pixel, the computational complexity is significantly increased.

Therefore, it is highly desirable to provide an imaging system and method that achieve an enhanced quality of disparity map without aggravating the complexity of the more computationally intensive part of the imaging system and method.

SUMMARY OF CERTAIN INVENTIVE ASPECTS

Certain inventive aspects relate to an imaging system and method that improves the quality of a disparity map by using edge information of one of the images as a guidance to identify regions on the disparity map that need improvement so that the quality of the disparity map is improved without increasing the complexity of the computationally intensive part such as disparity estimation. Using edge information as a guidance to improve the quality of the disparity map may even reduce the complexity of disparity estimation.

According to an embodiment, an imaging system includes an edge-detecting module, first and second disparity-estimating modules, a cross-checking module, an occlusion-refining module, and a hole-filling module. The edge-detecting module is configured to detect one or more edge coordinates of at least a reference line in a first image. The first and second disparity-estimating modules are respectively configured to obtain a current line of a first estimated disparity map of the first image with respect to a second image and a second estimated disparity map of the second image with respect to the first image. The cross-checking module is configured to cross check the current line of the first estimated disparity map using the current line of the second estimated disparity map to identify a set of occlusion pixels in the current line of the first estimated disparity map. The occlusion-refining module is arranged to refine the set of occlusion pixels to create a refined set of occlusion pixels. The hole-filling module is arranged to fill the refined set of occlusion pixels in the current line of the first estimated disparity map to obtain a current line of a first refined disparity map.

According to an embodiment, the occlusion-refining module comprises a refining base buffer configured to refine the set of occlusion pixels by identifying a pixel under refinement on the current line of the first estimated disparity map as occluded based on the number of occlusion pixels in a refining base region not beyond the nearest edge coordinates to the pixel under refinement in the current line of the first estimated disparity map in respectively a first direction and the direction opposite to the first direction, edge coordinates corresponding to a portion of the current line of the first estimated disparity map in the refining base region, and the current line of the first estimated disparity map in the direction opposite to the second direction using the refining base buffer and the current line of the first estimated disparity map containing the set of occlusion pixels, and update the refining base buffer with the current line of first estimated disparity map containing the set of occlusion pixels or the refined set of occlusion pixels and information related to the detected one or more edge coordinates of the reference line of the first image According to an embodiment, the hole-filling module is configured to fill the refined set of occlusion pixels in the current line of the first estimated disparity map based on at least a respective nearby pixel of each occlusion pixel.

According to an embodiment, the refining base region is further not beyond pixels with predetermined distances from the pixel under refinement in the current line of the first estimated disparity map in respectively the first direction and the direction opposite to the first direction. According to an embodiment, the refining base region is further not beyond a line with a predetermined distance from the current line of the first estimated disparity map in the second direction.

According to an embodiment, the occlusion-refining module, identifies the pixel under refinement as occluded when the number of occlusion pixels confined to the refining base region is more than half of the total number of pixels confined to the refining base region.

According to an embodiment, the hole-filling module comprises a filling base buffer, and is configured to fill the refined set of occlusion pixels in the current line of the first estimated disparity map by filling a pixel under filling in the refined set of occlusion pixels based on statistical information of disparity levels of pixels in a filling base region not beyond the nearest edge coordinates to the pixel under filling in the current line of the first estimated disparity map in respectively in the first direction and the direction opposite to the first direction, and the current line of the first estimated disparity map in the direction opposite to the second direction to obtain the current line of the first refined disparity map using the filling base buffer and the current line of the first estimated disparity map containing the refined set of occlusion pixels, and update the filling base buffer with the current line of the first refined disparity map.

According to an embodiment, the filling base region is further not beyond pixels with predetermined distances from the pixel under filling in the current line of the first estimated disparity map in respectively the first direction and the direction opposite to the first direction. According to an embodiment, the filling base region is further not beyond a line with a predetermined distance from the current line of the first estimated disparity map in the second direction. According to an embodiment, the filling base region is further not beyond the line containing the pixel under filling in the direction opposite to the second direction.

According to an embodiment, the hole-filling module obtains the statistical information by performing a multi-stage voting method comprising: obtaining a range of disparity levels that the highest number of pixels in the filling base region are associated with; and obtaining a disparity level in the range of disparity levels that the highest number of pixels in the filling base region are associated with.

According to another embodiment, a computer system includes one or more memories storing information including program routines and one or more processing units coupled to the one or more memories for controlling the execution of the program routines. The program routines include an edge-detecting module, first and second disparity-estimating modules, a cross-checking module, an occlusion-refining module and a hole-filling module. The edge-detecting module is configured to detect edge coordinates in a first image. The first and second disparity-estimating modules are respectively configured to obtain a first estimated disparity map of the first image relative to a second image and a second estimated disparity map of the second image relative to the first image. The cross-checking module is configured to cross check the first estimated disparity map using the second estimated disparity map to identify a set of occlusion pixels in the first estimated disparity map. The occlusion-refining module is arranged to refine the set of occlusion pixels to create a refined set of occlusion pixels. The hole-filling module is arranged to fill the refined set of occlusion pixels in the current line of the first estimated disparity map to obtain a current line of a first refined disparity map.

According to an embodiment, the occlusion-refining module is configured to refine the set of occlusion pixels by identifying at least a pixel under refinement on the first estimated disparity map as occluded based on the number of occlusion pixels in a refining base region not beyond the nearest edge coordinates to the pixel under refinement in a line containing the pixel under refinement in respectively a first direction and the direction opposite to the first direction, and edge coordinates corresponding to a portion of the line containing the pixel under refinement in the refining base region in respectively a second direction and a direction opposite to the second direction.

According to an embodiment, the hole-filling module is configured to fill the refined set of occlusion pixels based on at least a respective nearby pixel of each occlusion pixel.

According to another embodiment, an imaging method includes providing a first and a second image; detecting edge coordinates in the first image; obtaining a first estimated disparity map of the first image relative to the second image and a second estimated disparity map of the second image relative to the first image; cross-checking the first estimated disparity map using the second estimated disparity map to identify a set of occlusion pixels in the first estimated disparity map; refining the set of occlusion pixels to create a refined set of occlusion pixels; filling the refined set of occlusion pixels in the current line of the first estimated disparity map to obtain a current line of a first refined disparity map.

According to an embodiment, refining the set of occlusion pixels comprises identifying a pixel under refinement on the first estimated disparity map as occluded based on the number of occlusion pixels in a refining base region not beyond the nearest edge coordinates to the pixel under refinement in a line containing the pixel under refinement in respectively a first direction and the direction opposite to the first direction, and edge coordinates corresponding to a portion of the line containing the pixel under refinement in the refining base region in respectively a second direction and a direction opposite to the second direction.

According to an embodiment, filling the refined set of occlusion pixels is based on at least a respective nearby pixel of each occlusion pixel.

According to an embodiment, the refining base region is not beyond the line containing the pixel under refinement in the direction opposite to the second direction. According to an embodiment, the refining base region is further not beyond pixels with predetermined distances from the pixel under refinement in the line containing the pixel under refinement in respectively the first direction and the direction opposite to the first direction. According to an embodiment, the refining base region is further not beyond a line with a predetermined distance from the line containing the pixel under refinement in the second direction.

According to an embodiment, the occlusion-refining module identifies the pixel under refinement as occluded when the number of occlusion pixels confined to the refining base region is more than half of the total number of pixels confined to the refining base region.

According to an embodiment, the hole-filling module fills a pixel under filling in the refined set of occlusion pixels based on statistical information of disparity levels of pixels in a filling base region not beyond the nearest edge coordinates to the pixel under filling in a line containing the pixel under filling in respectively in the first direction and the direction opposite to the first direction.

According to an embodiment, the filling base region is further not beyond pixels with predetermined distances from the pixel under filling in the line containing the pixel under filling in respectively the first direction and the direction opposite to the first direction. According to an embodiment, the filling base region is further not beyond a line with a predetermined distance from the line containing the pixel under filling in the second direction. According to an embodiment, the filling base region is further not beyond the line containing the pixel under filling in the direction opposite to the second direction.

According to an embodiment, the hole-filling module obtains the statistical information by performing a multi-stage voting method comprising obtaining a range of disparity levels that the highest number of pixels in the filling base region are associated with; and obtaining a disparity level in the range of disparity levels that the highest number of pixels in the filling base region are associated with.

According to another embodiment, a non-transitory computer-readable recording medium stores a computer program for causing a computer system to perform the above-mentioned imaging method.

Certain additional inventive aspects and advantages will be described hereinafter. It should be appreciated by those skilled in the art that the conception and specific embodiment disclosed might be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The objectives and advantages of the present invention will become apparent upon reading the following description and upon reference to the accompanying drawings in which.

DETAILED DESCRIPTION OF CERTAIN ILLUSTRATIVE EMBODIMENTS

Figure 1:
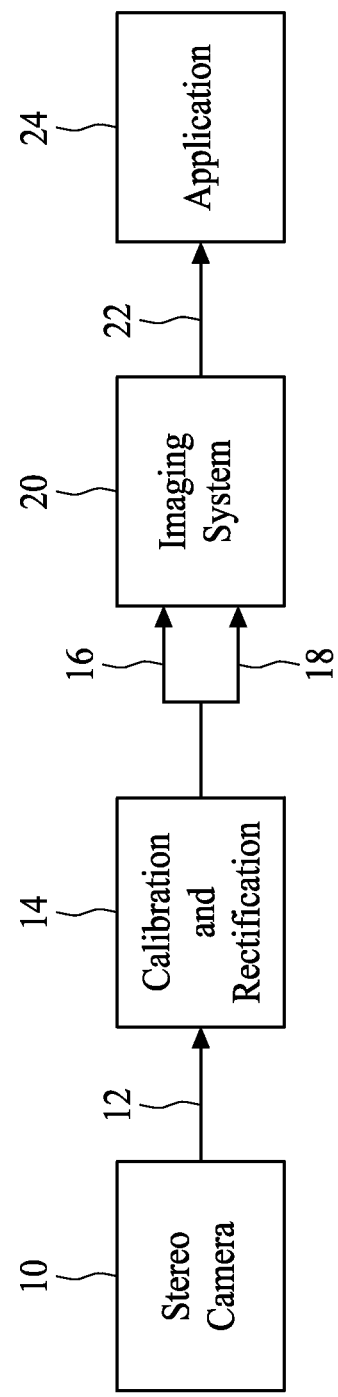
FIG. 1 is a block diagram illustrating an application of an imaging system according to an embodiment of the present invention.

FIG. 1 is a block diagram illustrating an application of an imaging system 20 according to an embodiment of the present invention. Referring to FIG. 1, in this application of the imaging system 20, a stereo camera 10 comprising two cameras capturing two raw images 12 or video of a scene from different view points. The stereo camera can be any image recording device capable of capturing two images of a scene from different viewpoints. Depending on different applications, the cameras may be integrated in one apparatus or separately configured. A calibration and rectification block 14 calibrates the two raw images 12 to remove lens distortion and rectifies the two raw images 12 to remove co-planar and epi-polar mismatch so that the output first image 16 and second image 18 may be compared on line-to-line basis. The imaging system 20 generates a depth map 22 using the first image 16 and the second image 18. The depth map 22 provides distance information of objects in the scene from the stereo camera 10. Because the depth map 22 can be directly calculated using a disparity map obtained by measuring disparity distances of the first image 16 and the second image 18, the disparity map will be referred to as the output of the imaging system 20 hereafter. An application block 24 can thereby use the depth map 22 to perform, for example, 3D gesture recognition, viewpoint synthesis, and stereoscopic TV presentation.

The imaging system 20 may be implemented in hardware such as in field programmable gate array (FPGA) and in application-specific integrated circuit (ASIC), or implemented in software using a general purpose computer system, or a combination thereof. Hardware implementation may achieve a higher performance compared to software implementation but at a higher design cost. For real-time applications, due to the speed requirement, hardware implementation is usually chosen.

Figure 2:
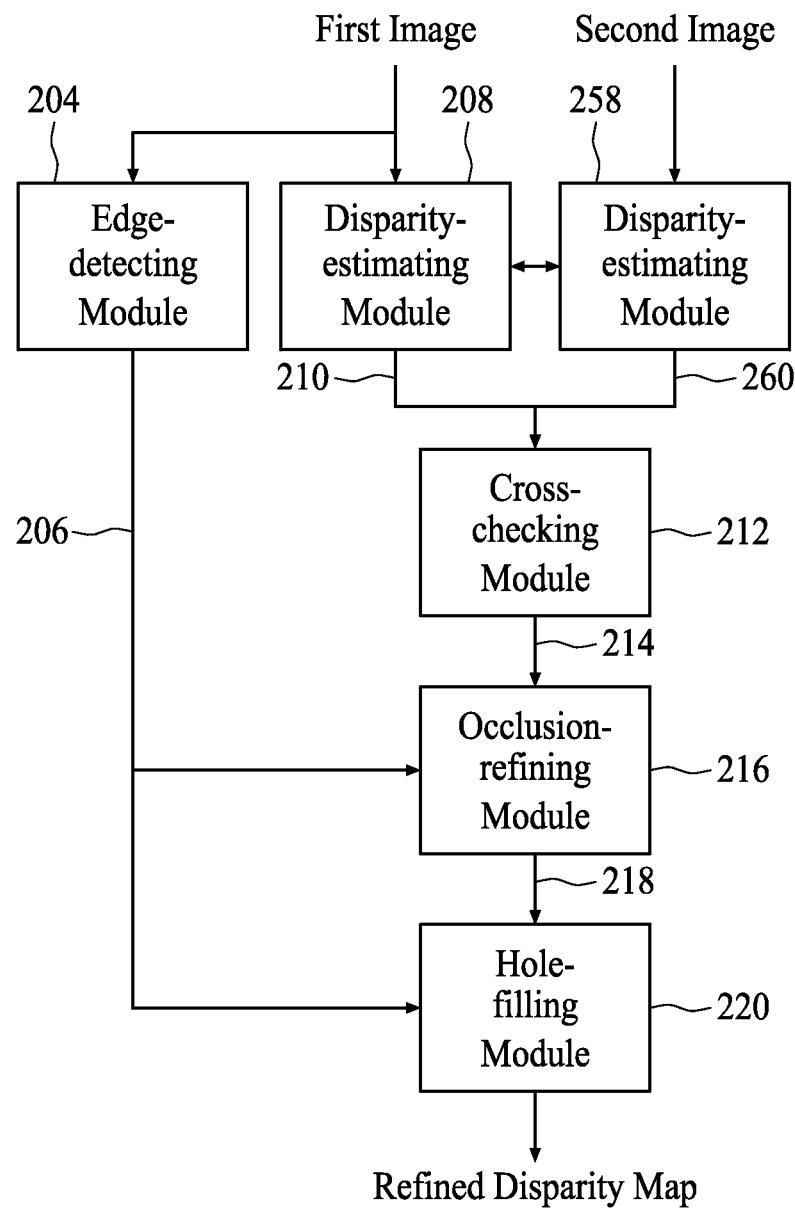
FIG. 2 is a block diagram illustrating an imaging system according to an embodiment of the present invention.
Figure 3:
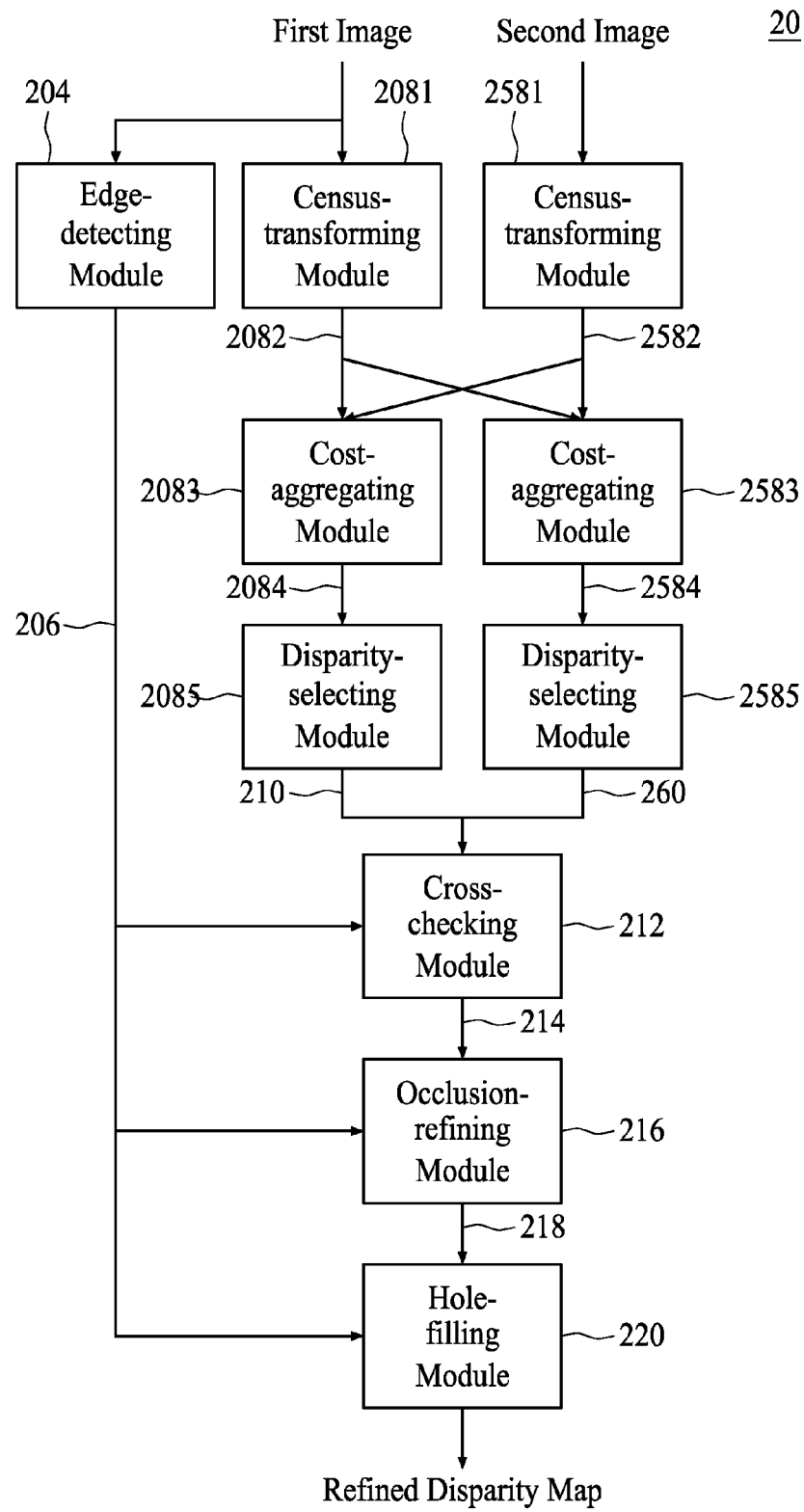
FIG. 3 is a block diagram illustrating an imaging system according to another embodiment of the present invention.

FIGS. 2 and 3 are block diagrams each illustrating an imaging system according to an embodiment of the present invention. Referring to FIG. 2, according to an embodiment, an imaging system 20 implemented in pipelined hardware receives a first image and a second image, outputs a refined disparity map and includes an edge-detecting module 204, first and second disparity-estimating modules 208, 258, a cross-checking module 212, an occlusion-refining module 216, and a hole-filling module 220.

The edge-detecting module 204 is configured to receive at least a reference line in the first image and detect one or more edge coordinates in the reference line of the first image to generate an edge map 206. Corresponding to positions on the reference line of the first image, a current line of the refined disparity map is generated.

The first disparity-estimating module 208 is configured to receive a current line of the first image and obtain a current line of a first estimated disparity map 210 of the first image with respect to the second image (as shown by the left-bound part of the double arrow in the figure). Similarly, the second disparity-estimating module 258 is configured to receive a current line of the second image and obtain a current line of a second estimated disparity map 260 of the second image with respect to the first image (as shown by the right-bound part of the double arrow in the figure). The first or second disparity-estimating module 208 or 258 may be implemented using a global method or a local method. As described above, local methods have much lower complexity compared to global methods and therefore, in one embodiment of the present invention described below, a local method is adopted to achieve higher speed for, e.g. real-time applications.

Referring to FIGS. 2 and 3, according to an embodiment, the first disparity-estimating module 208 includes a first census-transforming module 2081, a first cost-aggregating module 2083 and a first disparity-selecting module 2085; the second disparity-estimating module 258 includes a second census-transforming module 2581, a second cost-aggregating module 2583 and a first disparity-selecting module 2585.

The first census-transforming module 2081, including a first census buffer (not shown), is configured to receive the current line of the first image and use the first census buffer and the current line of the first image to produce a correlation line of the first image, which is census transformed, update the first census buffer with the current line of the first image, and output the census transformed correlation line 2082 of the first image. According to an embodiment, the size of the first census buffer is equal to a product of a width of the first image, a bit length of a pixel and a height of 2 lines. The height is determined by neighbors used for census transformation. Similarly, the second census-transforming module 2581, including a second census buffer, is configured to receive the current line of the second image and use the second census buffer and the current line of the second image to produce a correlation line of the second image, which is census transformed, update the second census buffer with the current line of the second image, and output the census transformed correlation line 2582 of the second image.

The first cost-aggregating module 2083, including a first aggregation window buffer (not shown), is configured to receive correlation lines 2082 and 2582 of the first image and the second image, respectively, calculate current matching costs of the correlation line 2082 of the first image with respect to the correlation line 2582 of the second image for a plurality of disparity distances, aggregate matching costs using the first aggregation window buffer and the current matching costs for the plurality of disparity distances, update the first aggregation window buffer with the current matching costs, and output the aggregated matching costs 2084 for the plurality of disparity distances. In the present embodiment, the correlation lines of the first and second images are respectively obtained from the output 2082 of the first census-transforming module 2081 and the output 2582 of the second census-transforming module 2581. According to an embodiment, the size of the first aggregation window buffer is equal to a product of the width of the first image, a bit length of a pixel and a height of an aggregation window, which will be described in greater detail later.

Similarly, the second cost-aggregating module 2583, including a second aggregation window buffer (now shown), is configured to receive the correlation lines 2082 and 2582 of the first image and the second image, respectively, calculate current matching costs of the correlation line 2582 of the second image with respect to the correlation line 2082 of the first image for a plurality of disparity distances, aggregate matching costs using the second aggregation window buffer and the current matching costs for the plurality of disparity distances, update the second aggregation window buffer with the current matching costs, and output the aggregated matching costs 2584 for the plurality of disparity distances. It is noted that in this embodiment, cost aggregation is performed on a census transformed image. However, the present invention is not limited to be implemented in this way. Cost aggregation in other embodiments may be performed on a non-transformed image.

The first disparity-selecting module 2085 is configured to receive the aggregated matching costs 2084 for the plurality of disparity distances of the first cost-aggregating module 2083, select, respectively for each coordinate on a current line of a first estimated disparity map 210, one of the disparity distances as a disparity level at the coordinate of the first estimated disparity map 210, and output the current line of the first estimated disparity map 210. Similarly, the second disparity-selecting module 2585 is configured to receive the aggregated matching costs 2584 for the plurality of disparity distances from the second cost-aggregating module 2583, select, respectively for each coordinate on a current line of a second estimated disparity map 260, one of the disparity distances as a disparity level at the coordinate of the second estimated disparity map 260, and output the current line of the second estimated disparity map 260.

The cross-checking module 212 is configured to receive the current line of the first estimated disparity map 210 and the current line of the second estimated disparity map 260, cross check the current line of the first estimated disparity map 210 using the current line of the second estimated disparity map 260 to identify a set of occlusion pixels 214 in the current line of the first estimated disparity map 210 or vice versa and output the set of occlusion pixels 214 in the current line of the first estimated disparity map 210. The set of occlusion pixels 214 may contain zero or more occlusion pixels.

The occlusion-refining module 216, including a refining base buffer (not shown), is configured to receive the set of occlusion pixels 214 in the current line of the first estimated disparity map 210, refine the set of occlusion pixels 214 by identifying a pixel under refinement on the current line of the first estimated disparity map 210 as occluded based on the number of occlusion pixels in a refining base region using the refining base buffer and the current line of the first estimated disparity map 210 containing the set of occlusion pixels 214, and update the refining base buffer with the current line of first estimated disparity map 210 containing the set of occlusion pixels 214 or the refined set of occlusion pixels 218 and information related to the detected one or more edge coordinates of the reference line of the first image in the edge map 206. The refining base region is not beyond the nearest edge coordinates to the pixel under refinement in the current line of the first estimated disparity map 210 in respectively a first direction and the direction opposite to the first direction, edge coordinates corresponding to a portion of the current line of the first estimated disparity map 210 in the refining base region, and the current line of the first estimated disparity map 210 in the direction opposite to the second direction. The information related to the detected one or more edge coordinates can be but not limited to be a distance between each pixel of the current line of the first estimated disparity map 210 and the respective edge coordinates in the second direction. For example, if the pixel on the current line of the first estimated disparity map 210 is located at an edge coordinate detected on the reference line of the first image, the distance will be set as zero; otherwise, the distance of the pixel will be the distance of the corresponding pixel in the previous line of the current line incremented by one.

According to an embodiment, the refining base region is further not beyond pixels with predetermined distances $r_r$, $r_l$ from the pixel under refinement in the current line of the first estimated disparity map in respectively the first direction and the direction opposite to the first direction. According to another embodiment, the refining base region is further not beyond a line with a predetermined distance $r_u$ from the current line of the first estimated disparity map in the second direction. According to this embodiment, the size of the refining base buffer is equal to a product of the width of the first image, the sum of a bit length equal to the predetermined distance $r_u$ and a bit length required for storing the information related to the detected one or more edge coordinates of the reference line of the first image, which, according to an embodiment, is equal to $\log_2(r_u)+1$.

The hole-filling module 220 is configured to receive the set of refined occlusion pixels 218 in the current line of the first estimated disparity map 210, fill the refined set of occlusion pixels 218 in the current line of the first estimated disparity map 210 based on at least a respective nearby pixel of each occlusion pixel to generate a current line of a first refined disparity map. According to an embodiment, the hole-filling module 220 uses a disparity level of the nearest non-occlusion pixel to a pixel under filling in the current line of the first estimated disparity map 210 to fill the pixel under filling. According to another embodiment, the hole-filling module 220, including a filling base buffer (not shown), is configured to fill the refined set of occlusion pixels 218 in the current line of the first estimated disparity map 210 by filling a pixel under filling in the refined set of occlusion pixels 218 based on statistical information of disparity levels of pixels in a filling base region not beyond the nearest edge coordinates to the pixel under filling in the current line of the first estimated disparity map 210 in respectively in the first direction and the direction opposite to the first direction, and the current line of the first estimated disparity map 210 in the direction opposite to the second direction to obtain the current line of the first refined disparity map using the filling base buffer and the current line of the first estimated disparity map 210 containing the refined set of occlusion pixels 218.

According to an embodiment, the filling base region is further not with predetermined distances $s_r$, $s_l$ from the pixel under refinement in the current line of the first estimated disparity map in respectively the first direction and the direction opposite to the first direction. In addition, according to an embodiment, the filling base region is further not beyond a line with a predetermined distance $s_u$ from the current line of the first estimated disparity map in the second direction. According to an embodiment, the predetermined distance $s_u$ is equal to one line, and in this embodiment, the size of the filling base buffer is the product of the width of the first image, and the sum of a bit length required by the maximum disparity level for storing a disparity level of a pixel in the previous line, a bit length of 1 is required for marking a pixel of previous line as an edge pixel. and a bit length of 1 for marking a pixel on the current line of the first estimated disparity map 210 as an occlusion pixel.

According to another embodiment, an imaging system 20 is implemented using a general purpose computer system in software. The general purpose computer system includes one or memories (not shown) for storing information including program routines, and one or more processing unit (not shown) coupled to the one or more memories for controlling execution of the program routines including software modules. Referring to FIG. 2, according to an embodiment, the program routine includes an edge-detecting module 204, first and second disparity-estimating modules 208, 258, a cross-checking module 212, an occlusion-refining module 216, and a hole-filling module 220.

The edge-detecting module 204 is configured to detect edge coordinates in the first image. The first disparity-estimating module 208 is configured to obtain a first estimated disparity map 210 of the first image relative to a second image (as shown by the left-bound part of the double arrow in the figure). Similarly, the second disparity-estimating module 258 is configured to obtain a second estimated disparity map 260 of the second image relative to the first image (as shown by the right-bound part of the double arrow in the figure). The cross-checking module 212 is configured to cross check the first estimated disparity map 210 using the second estimated disparity map 260 to identify a set of occlusion pixels 214 in the first estimated disparity map 210. The occlusion-refining module 216 is configured to refine the set of occlusion pixels 214 by identifying at least a pixel under refinement on the first estimated disparity map 210 as occluded based on the number of occlusion pixels in a refining base region to obtain a refined set of occlusion pixels 218. According to an embodiment, the refining base region is not beyond the nearest edge coordinates to the pixel under refinement in a line containing the pixel under refinement in respectively a first direction and the direction opposite to the first direction, and edge coordinates corresponding to a portion of the line containing the pixel under refinement between the nearest edge coordinates in respectively a second direction and a direction opposite to the second direction. The hole-filling module 220 is configured to fill the refined set of occlusion pixels 218 based on at least a respective nearby pixel of each occlusion pixel to obtain a first refined disparity map.

The above described embodiments are only examples of the imaging system 20 and alternative equivalent implementations are possible. For example, the order of operations in the modules may be different, and not all modules are required, which will become more apparent from the following description. Detail operations of the modules may be directly derived from the following description for an imaging method according to an embodiment of the present invention.

Figure 4:
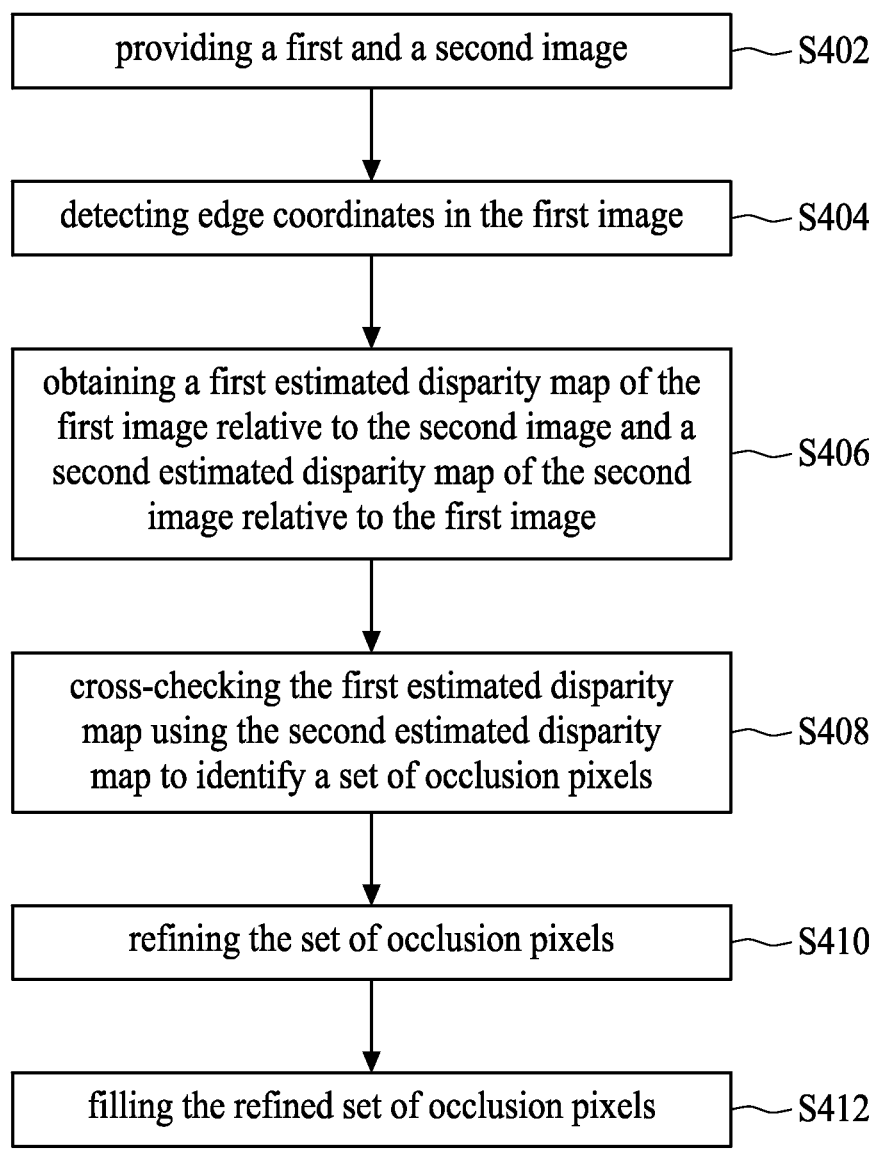
FIG. 4 is a flow chart illustrating an imaging method according to still another embodiment of the present invention.
Figure 5:
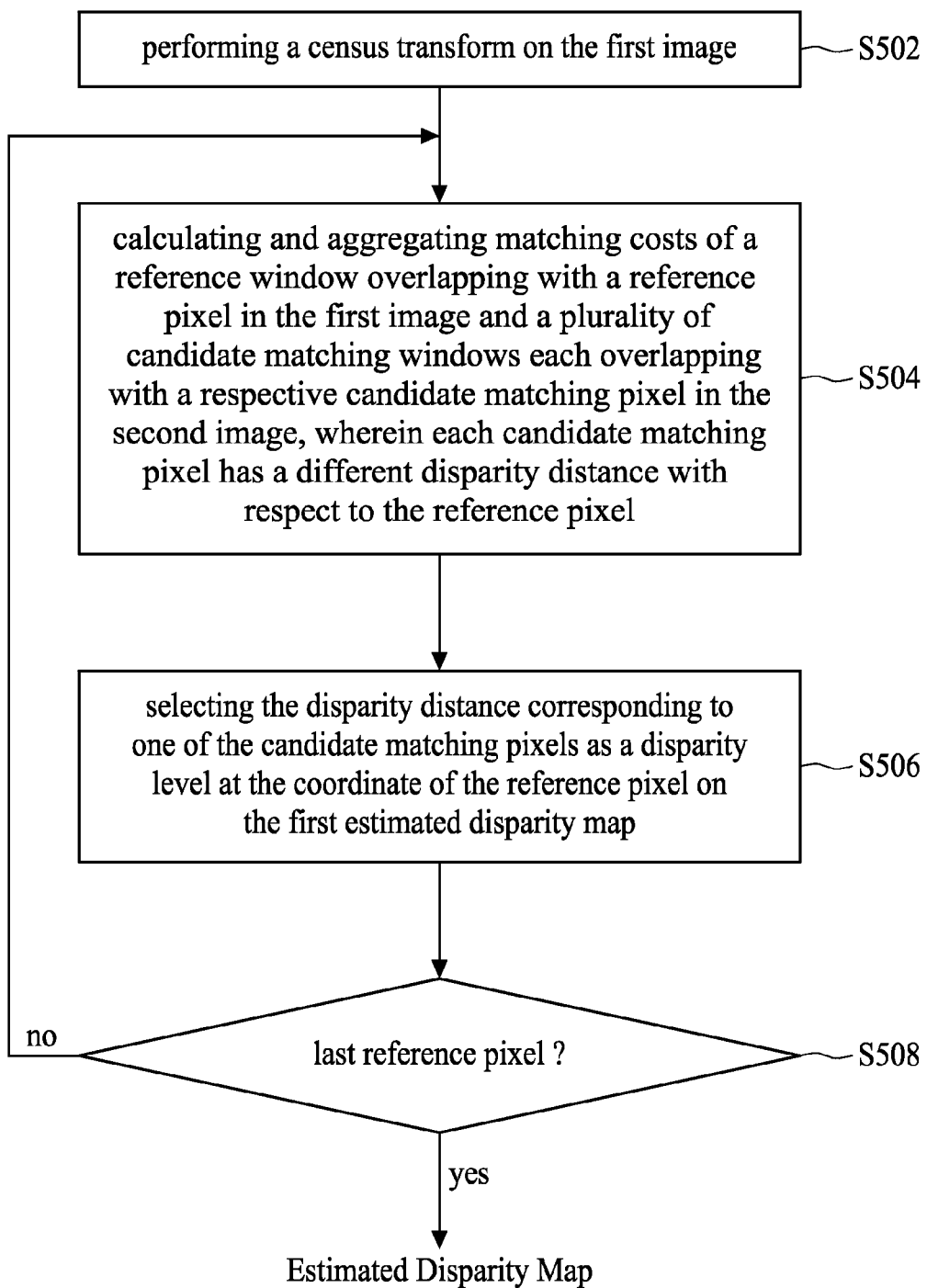
FIG. 5 is a flow chart illustrating a disparity-estimating step carried out with a local method according to an embodiment of the present invention.
Figure 6:
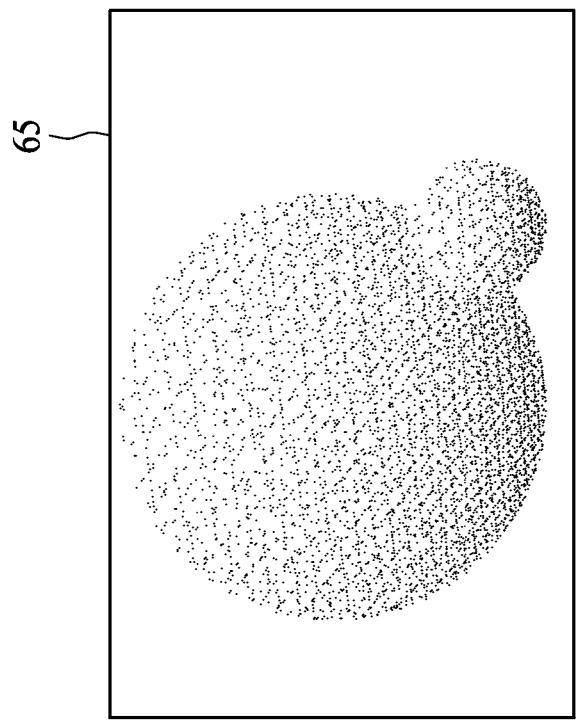
FIG. 6 is a schematic diagram illustrating first and second images on which stereo-matching is performed.
Figure 6:
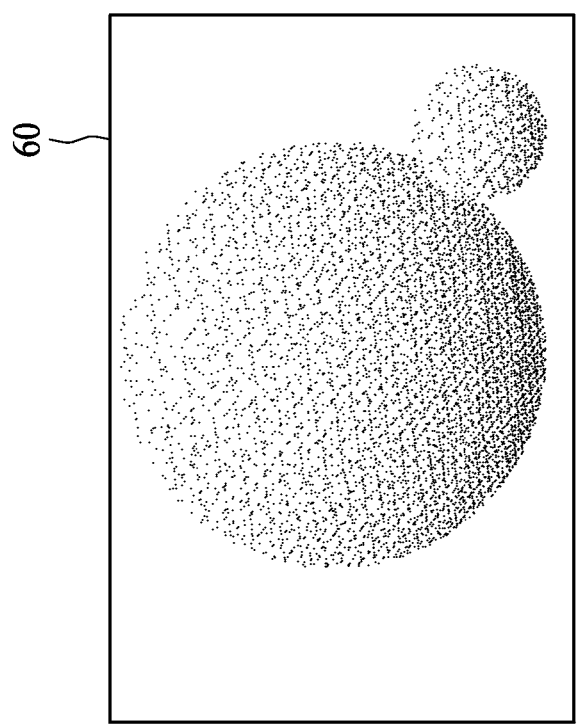
Figure 7:
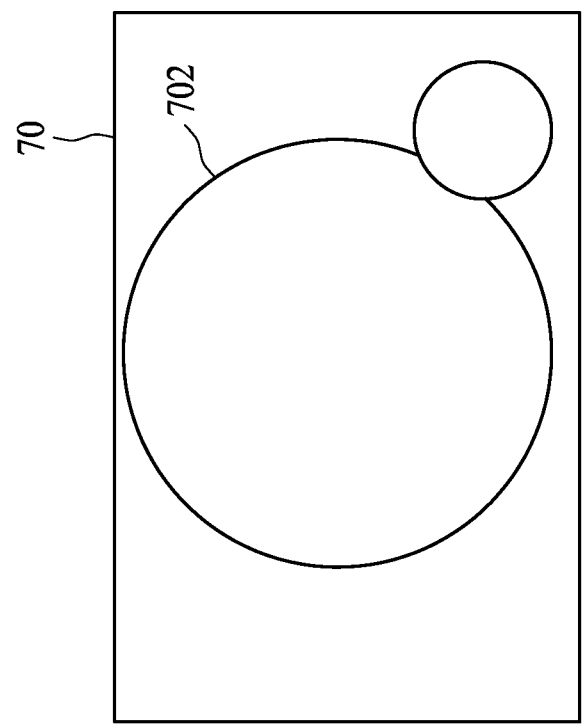
FIG. 7 is a schematic diagram illustrating edge maps according to an embodiment of the present invention.
Figure 8:
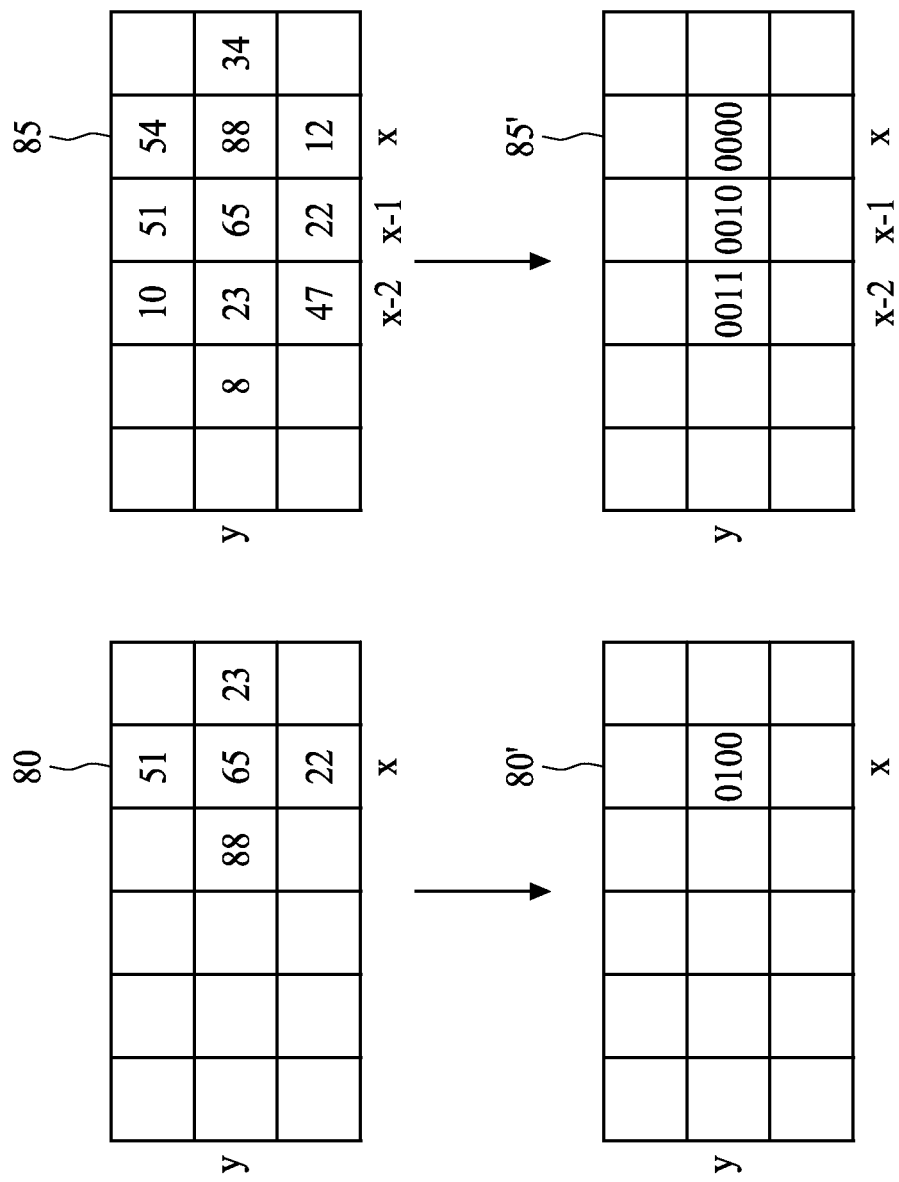
FIG. 8 is a schematic diagram illustrating a census-transforming step according to an embodiment of the present invention.
Figure 9:
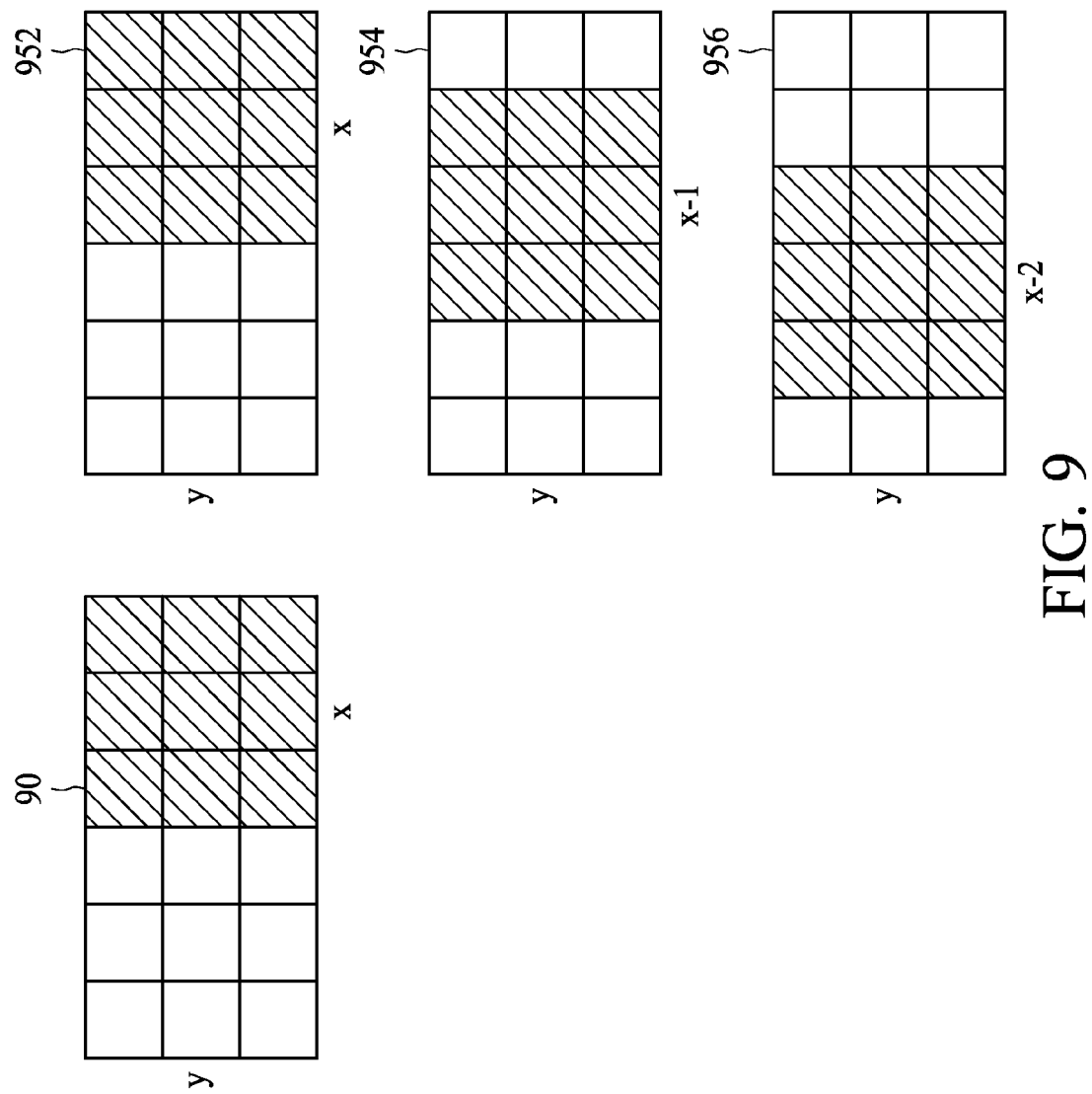
FIG. 9 is a schematic diagram illustrating a cost-aggregating step according to an embodiment of the present invention.
Figure 10:
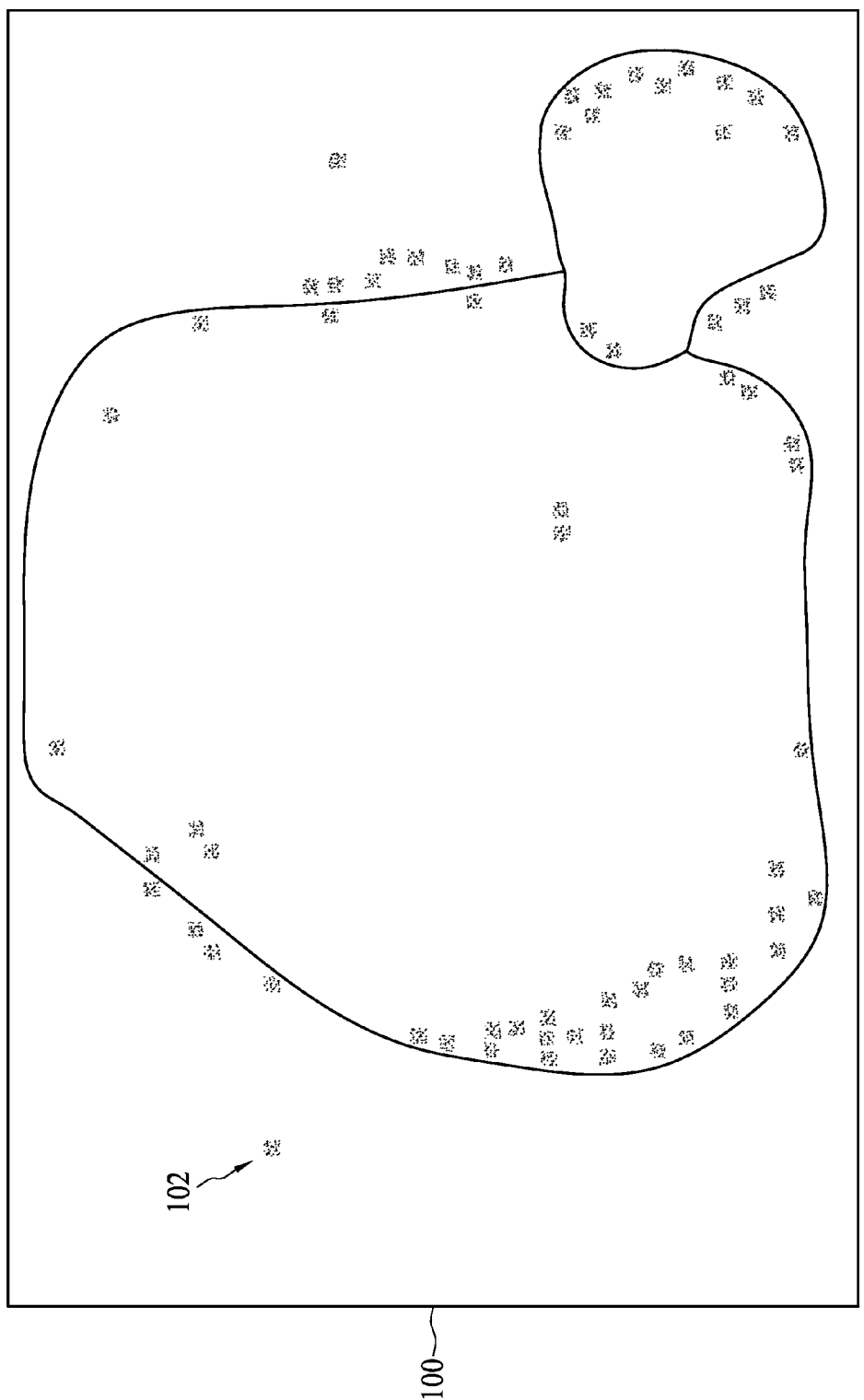
FIG. 10 is a schematic diagram illustrating a cross-checking step according to an embodiment of the present invention.
Figure 11:
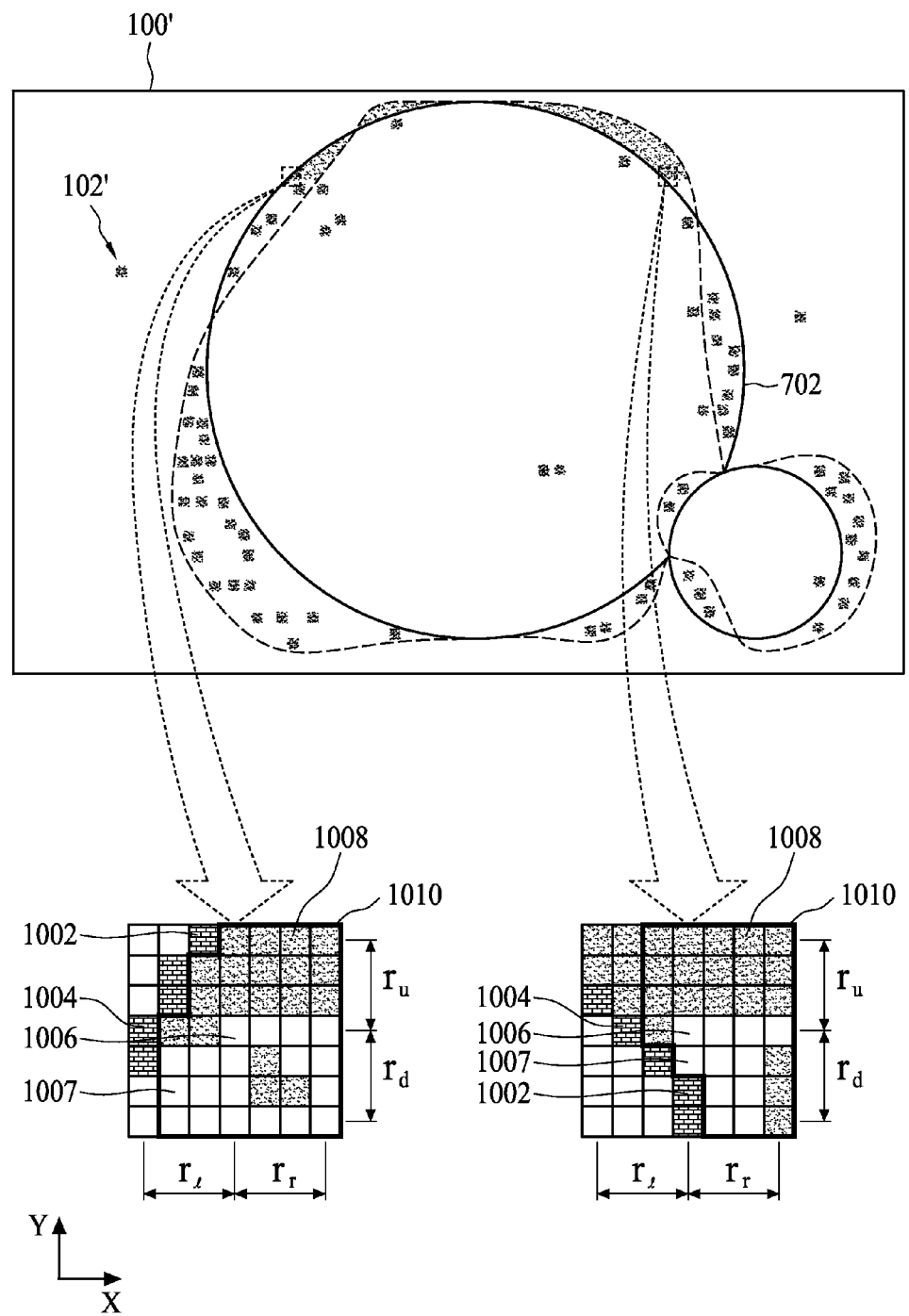
FIGS. 11 and 12 are schematic diagrams illustrating an occlusion-refining step according to different embodiments of the present invention.
Figure 12:
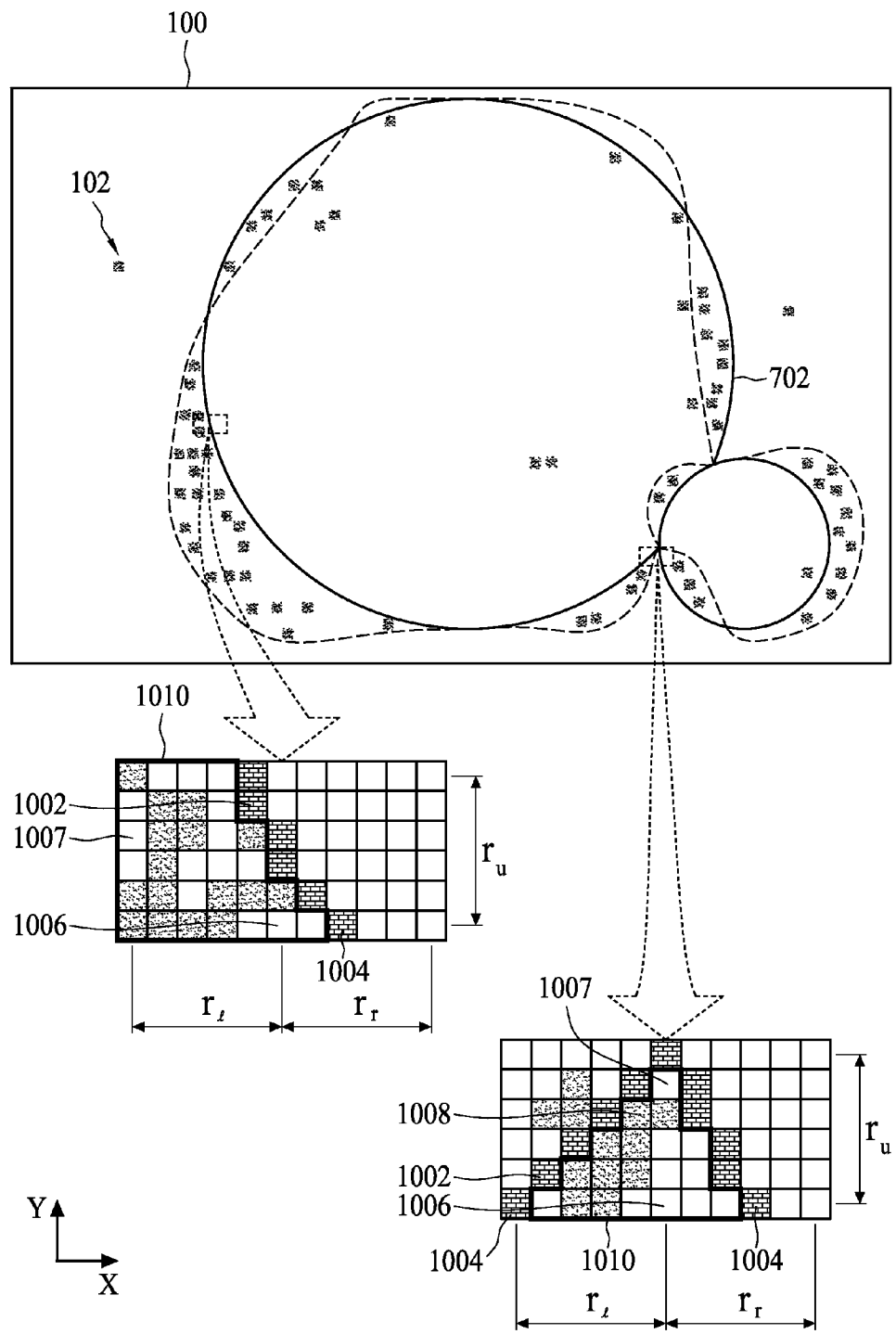
Figure 13:
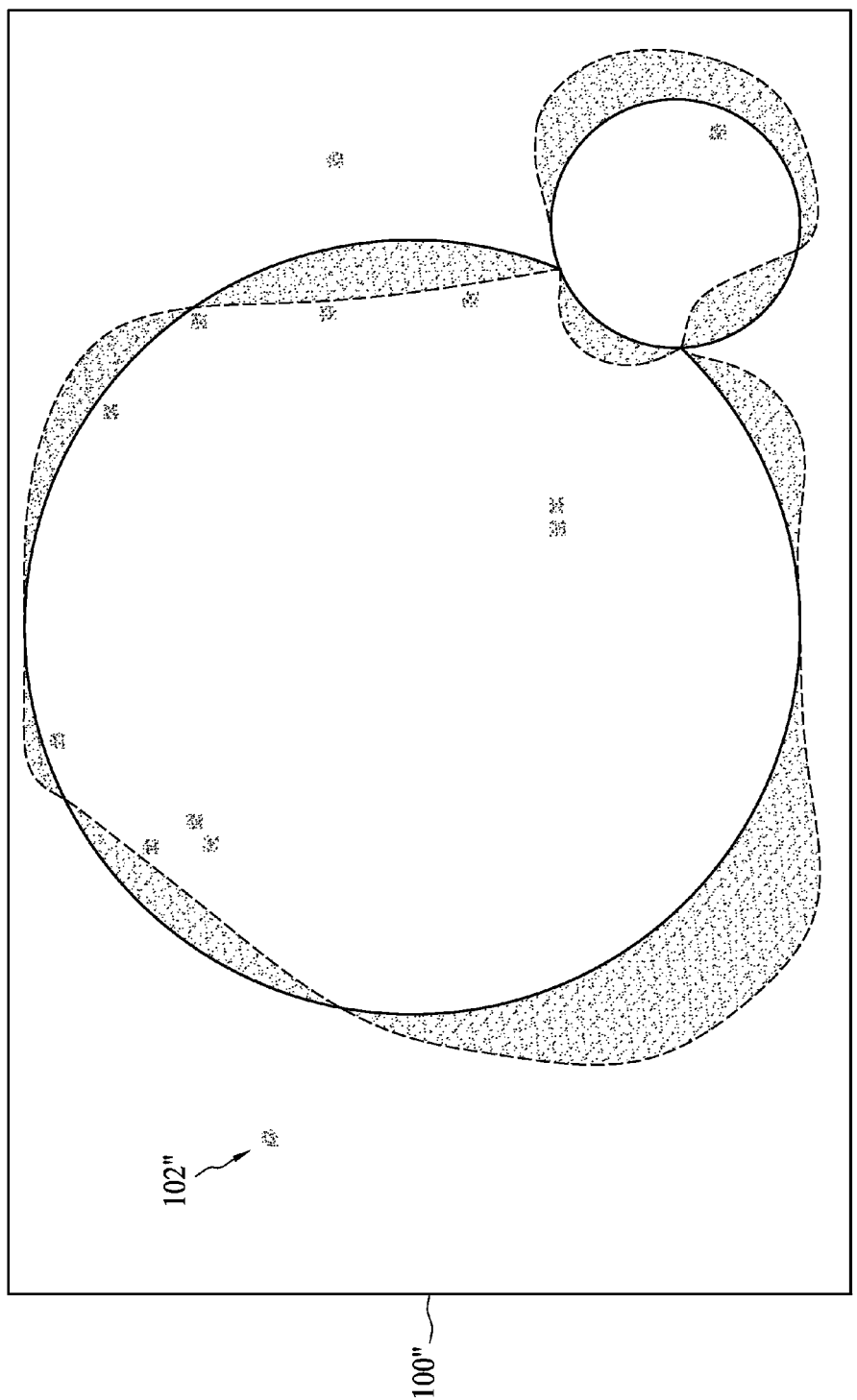
FIG. 13 is a schematic diagram illustrating a result of an occlusion-refining step according to an embodiment of the present invention.
Figure 14:
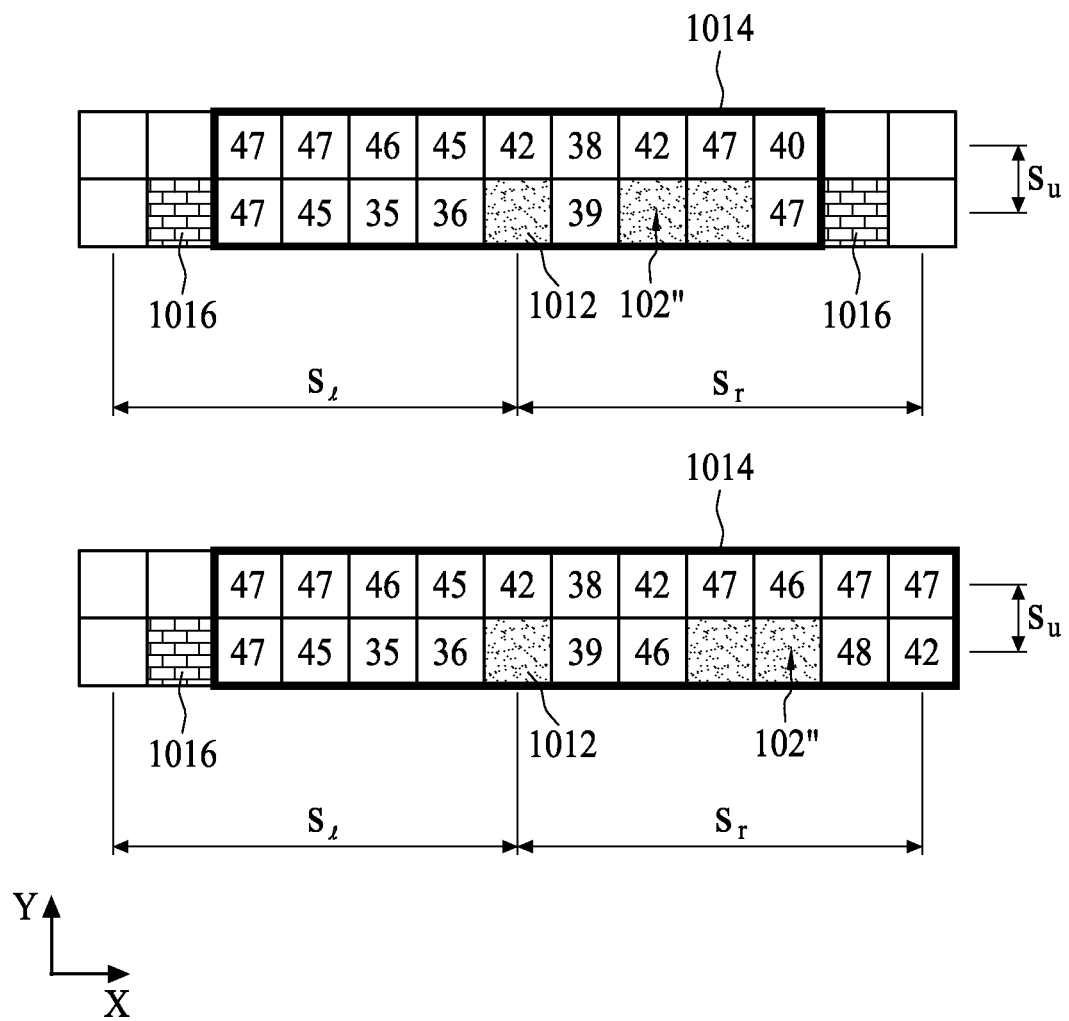
FIG. 14 is a schematic diagram illustrating a hole-filling step according to an embodiment of the present invention.

FIG. 4 is a flow chart illustrating an imaging method according to an embodiment of the present invention. FIG. 5 is a flow chart illustrating a disparity-estimating step carried out with a local method according to an embodiment of the present invention. FIG. 6 is a schematic diagram illustrating first and second images on which stereo-matching is performed. FIG. 7 is a schematic diagram illustrating edge maps according to an embodiment of the present invention. FIG. 8 is a schematic diagram illustrating a census-transforming step according to an embodiment of the present invention. FIG. 9 is a schematic diagram illustrating a cost-aggregating step according to an embodiment of the present invention. FIG. 10 is a schematic diagram illustrating a cross-checking step according to an embodiment of the present invention. FIGS. 11 and 12 are schematic diagrams illustrating an occlusion-refining step according to different embodiments of the present invention. FIG. 13 is a schematic diagram illustrating a result of an occlusion-refining step according to an embodiment of the present invention. FIG. 14 is a schematic diagram illustrating a hole-filling step according to an embodiment of the present invention.

According to an embodiment, the imaging method is a computer-implemented method and may be stored on a non-transitory computer readable recording medium for causing a computer system to perform the imaging method. Referring to FIG. 4, according to an embodiment, the imaging method 400 includes the steps of: providing a first and a second image (S402); detecting edge coordinates in the first image (S404); obtaining a first estimated disparity map of the first image relative to the second image and a second estimated disparity map of the second image relative to the first image (S406); cross-checking the first estimated disparity map using the second estimated disparity map to identify a set of occlusion pixels (S408); refining the set of occlusion pixels (S410); and filling the refined set of occlusion pixels (S412).

Referring to FIG. 4 and FIG. 6, in step S402, the first and second images 60, 65 are provided. As described above and shown in FIG. 6, the first image 60 and the second image 65 are rectified so that aligned horizontal lines in the first image 60 and second image 65 may be matched pixel-to-pixel. In this embodiment, the first image 60 is a left-view image and the second image 65 is a right-view image. In another embodiment, the first image may be a right-view image and the second image may be a left-view image.

Referring to FIG. 4, and also FIG. 7, in step S404, edge coordinates in the first image 60 are detected to obtain an edge map 70. In the edge map 70, edge coordinates 702 corresponding to pixels of object boundaries in the first image 60 are marked. Sharp object boundaries may be obtained using appropriate edge-detection techniques known in the art.

Referring to FIG. 4, in step S406, a first estimated disparity map of the first image 60 relative to the second image 65 is obtained. The first estimated disparity map may be obtained using a global method or a local method. As described above, the global method formulates the stereo-matching problem as an energy function which may be expressed by equation (1). The energy function includes a smoothness term $E_{smooth}(d)$ that may cause the first estimated disparity map to be smooth everywhere and therefore blur object boundaries and affect quality of the disparity map.

According to an embodiment, the disparity-estimating step S406 is carried out with a local method including the following steps. Reference will be made to FIG. 5, FIG. 6 and FIG. 9 in the following. In FIG. 9, the grid 90 represents a portion of pixels of the first image 60, and the grids 952, 954, 956 represent a portion of pixels in the second image 65. In step S504, matching costs of a reference window (the hatched portion in the grid 90) overlapping with a reference pixel with coordinate (x, y) in the first image 60, and a plurality of candidate matching windows (the hatched portions in the grids 952, 954 and 956) overlapping with respective candidate matching pixels e.g. with coordinates (x, y), (x-1, y), (x-2, y) . . . (x-$d_{max}$, y) in the second image 65 are calculated and aggregated. Each candidate matching pixel with a coordinate (x, y), (x-1, y), (x-2, y), . . . or (x-$d_{max}$, y) has a different disparity distance d=0, d=-1, d=-2 . . . , d=-$d_{max}$ with respect to the reference pixel (x, y). Then in step S506, the disparity distance d corresponding to one of the candidate matching pixels is selected as a disparity level at the coordinate (x, y) of the reference pixel on the first estimated disparity map according to the aggregated matching costs. In one embodiment, the disparity distance corresponding to the candidate matching pixel with the minimum aggregated matching cost is selected. Then in step S508, if the processed reference pixel at coordinate (x, y) is the last reference pixel in the first image 60, the first estimated disparity map is completed; otherwise, steps S504 and S506 are repeated. The cost-aggregating step S504 reduces the disturbance of noise on the first image 60 to the precision of the disparity map; however, it blurs object boundaries and affects the quality of the disparity map.

According to different embodiments, the aggregated matching costs C in step S504 may be calculated using sum of absolute differences (SAD), sum of squared differences (SSD) or normalized cross-correlation (NCC), respectively shown in equations (2)-(4).

$$C_{SAD} = \sum_{x,y} |I_1(x, y) - I_2(x-d, y)| \quad (2)$$

$$C_{SSD} = \sum_{x,y} (I_1(x, y) - I_2(x-d, y))^2 \quad (3)$$

$$C_{NCC} = \frac{\sum_{x,y} (I_1(x, y) \cdot I_2(x-d, y))}{\sqrt{\sum_{x,y} (I_1(x, y) \cdot I_2(x-d, y))^2}} \quad (4)$$

where x and y are coordinates of a reference pixel, d is a disparity distance, and $I_1$ and $I_2$ represent pixel intensities of the first and second images 60, 65, respectively.

Referring to FIGS. 4, 5 and 8, according to another embodiment, the step S406 further includes a census-transforming step S502 that performs a census transform on the first image 60. For example, in FIG. 8, the grid 80 shows pixel intensities of a portion of pixels in the first image 60. Performing a census transform on a pixel with a coordinate (x, y) in the first image 602 involves comparing a pixel intensity of the pixel with pixel intensities of its neighboring pixels, respectively, to obtain a bit vector as shown in the grid 80' at the coordinate (x, y). According to an embodiment, each pixel is compared with the immediate four neighboring pixels to obtain a bit vector of length 4. According to an embodiment, the bit vector length is at least 1. According to an embodiment, the bit vector length can be 1,2,3, or any higher number depending on how many neighboring pixels are compared. Compared to a pixel represented as the above-mentioned pixel intensity, a census-transformed pixel has a significantly shorter bit length. Similarly, a census transform is also performed on the second image 65. The grid 85 shows pixel intensities of a portion of pixels in the second image 85 and the grid 85' shows census-transformed pixels. For the census-transformed images, the aggregated matching costs C in step S504 may be calculated using Hamming Distance (HD) shown in equation (5):

$$C_{HD} = \Sigma_{x,y} \text{HD}(\text{BitVec}_1(x, y), \text{BitVec}_2(x-d, y)) \quad (5)$$

where x and y are coordinates of a reference pixel, d is a disparity distance, and $\text{BitVec}_1$ and $\text{BitVec}_2$ represent bit vectors of census-transformed pixels of the first and second images 60, 65, respectively.

Next, referring to FIG. 4 and FIG. 10, in step S408, the first estimated disparity map 100 is cross-checked with the second estimated disparity map to identify a set of occlusion pixels 102. In general, disparity levels of the object in the first estimated disparity map and the second estimated disparity map should be the same. Depending on locations of the view points, a portion of the object may be occluded in one of the images and is only visible in the other image. The cross-checking step S408 detects the occluded portion of the object and other mismatched portions. According to an embodiment, the cross-checking step S408 is performed based on a constraint shown below:

$$|D(x, y) - D'(x - D(x, y), y)| \leq \lambda \quad (6)$$

where D and D' respectively represent the first and second estimated disparity map, and λ is a predetermined cross-checking threshold. A pixel on the first estimated disparity map 100 that does not satisfy the constraint (6) will be included in the set of occlusion pixels 102. In addition, as shown in FIG. 10, because the quality of the estimated disparity map 100 may be affected by the smoothness term in the global method, the cost aggregation and/or census transformation in the local method, the object boundary is blurred in the first estimated disparity map 100.

Next, referring to FIG. 4, FIG. 11, FIG. 12 and FIG. 13, in step S410, the set of occlusion pixels 102' or 102 in the first estimated disparity map 100' or 100 shown in FIG. 11 or FIG. 12 are refined using the edge coordinates 702 obtained from the edge-detecting step S404 to generate a refined set of occlusion pixels 102" on the first estimated disparity map 100" as shown in FIG. 13. In FIG. 11 and FIG. 12, the grids shown on the bottom of the figures are the zoomed-in views at different portions of the first estimated disparity map 100' or 100 under occlusion refinement. According to an embodiment, the set of occlusion pixels 102' or 102 are refined by identifying a pixel under refinement 1006 on the first estimated disparity map 100' or 100 as occluded based on the number of occlusion pixels 1008 in a refining base region 1010 (in bold lines). The blank pixel 1006 and the blank pixels 1007 in the refining base region 1010 are non-occluded pixels based on the cross-checking step S408.

Referring to the zoomed-in view shown on the bottom left of FIG. 11, according to an embodiment, in a first direction (e.g. the X direction), the refining base region 1010 is not beyond the nearest edge coordinate (not shown) to the pixel under refinement 1006 and is further not beyond a pixel with a predetermined distance $r_r$ from the pixel under refinement 1006 in a line containing the pixel under refinement 1006. In the direction opposite to the first direction, the refining base region 1010 is not beyond the nearest edge coordinate 1004 to the pixel under refinement 1006 and is further not beyond a pixel with a predetermined distance $r_l$ from the pixel under refinement 1006 in the line containing the pixel under refinement 1006. In a second direction (e.g. the Y direction), the refining base region 1010 is not beyond the edge coordinates 1002 corresponding to the portion of the line containing the pixel under refinement 1006 in the refining base region 1010, and is further not beyond a line with a predetermined distance $r_u$ from the line containing the pixel under refinement 1006. In the direction opposite to the second direction, the refining base region 1010 is not beyond the edge coordinates (not shown) corresponding to the portion of the line containing the pixel under refinement 1006 in the refining base region 1010, and is further not beyond a line with a predetermined distance $r_d$ from the line containing the pixel under refinement. According to an embodiment the predetermined distances $r_r$, $r_l$, $r_u$ and $r_d$ are equal to at least 1 line. In the example shown on the bottom left of FIG. 11, the refining base region 1010 is bounded by the edge coordinate 1004 during the search for an edge coordinate in the direction opposite to the first direction, and by the edge coordinates 1002 in the second direction, and reaches up to the predetermined distances $r_r$ and $r_d$ in the first direction and the direction opposite to the second direction. Compared to the example shown on the bottom left of FIG. 11, the refining base region 1010 in the example shown on the bottom right of FIG. 11 is confined by the edge coordinates 1002 in the direction opposite to the second direction and reaches up to the predetermined distance $r_u$ in the second direction.

Referring to the zoomed-in view on the bottom left of FIG. 12, according to this embodiment, the direction opposite to a second direction (e.g. the Y direction) is not searched. Therefore, in a first direction (e.g. the X direction), the refining base region 1010 is not beyond the nearest edge coordinate 1004 to the pixel under refinement 1006 and is further not beyond a pixel with a predetermined distance $r_r$ from the pixel under refinement 1006 in a line containing the pixel under refinement 1006. In the direction opposite to the first direction, the refining base region 1010 is not beyond the nearest edge coordinate (not shown) to the pixel under refinement 1006 and is further not beyond a pixel with a predetermined distance $r_l$ in the line containing the pixel under refinement 1006. In the second direction, the refining base region 1010 is not beyond the edge coordinates 1002 corresponding to the portion of the line containing the pixel under refinement 1006 in the refining base region 1010, and is further not beyond a line with a predetermined distance $r_u$ from the line containing the pixel under refinement 1006. In the direction opposite to the second direction, the refining base region 1010 is not beyond the line containing the pixel under refinement 1006. In this example, the refining base region 1010 is bounded by the edge coordinate 1004 during the search for an edge coordinate in the first direction, and by the edge coordinates 1002 in the second direction, and reaches up to the predetermined distance $r_l$ in the direction opposite to the first direction. Compared to the example shown on the bottom left of FIG. 12, the refining base region 1010 in the example shown on the bottom right of FIG. 12 is confined by the edge coordinates 1004 during the search in both the first direction and the direction opposite to the first direction.

The phrase "not beyond" used in the description above means the region spans up to or within the specified boundaries.

Referring to FIG. 4 and FIG. 11, according to an embodiment, in step S410, the pixel under refinement 1006 is identified as occluded when the number of occlusion pixels 1008 confined to the refining base region 1010 is more than a predetermined percentage of the total number of pixels 1006, 1007 and 1008 confined to the refining base region 1010. According to an embodiment, the predetermined percentage is at least 0.1 to 0.9 In the embodiment shown in FIG. 11, the occlusion pixels identified during the occlusion-refining step S410 are counted along with the occlusion pixels obtained from the cross-checking step S408 in determining whether to mark the pixel under refinement 1006 as occluded. As shown in FIG. 11, the portion of the first estimated disparity map 100' above and to the left of the pixel under refinement 1006 have been processed by occlusion refinement and contain both the occlusion pixels from the cross-checking step S408 and the occlusion-refining step S410. In a different embodiment as illustrated in FIG. 12, only the occlusion pixels 1008 obtained from the cross-checking step S408 are counted in determining whether to mark the pixel under refinement 1006 as occluded.

Next, referring to FIG. 4 and FIG. 14, according to an embodiment, in step S412, the refined set of occlusion pixels 102" are filled based on at least a respective nearby pixel of each occlusion pixel to obtain a first refined disparity map. According to an embodiment, a pixel under filling 1012 is filled with the disparity level of the nearest non-occlusion pixel to the pixel under filling 1012 in a line containing the pixel under filling 1012 such as the second row in the grids shown in FIG. 14 assuming the filling process is performed from left to right and top to bottom. For example, the nearest non-occlusion pixel may be the pixel with the disparity level of 36 on the left of the pixel under filling 1012.

According to another embodiment, a pixel under filling 1012 in the refined set of occlusion pixels 102" is filled based on statistical information of disparity levels of pixels in a filling base region 1014 (in bold lines). According to an embodiment, the refining base region 1014 is not beyond the nearest edge coordinates 1016 to the pixel under filling 1012 in a line containing the pixel under filling 1012 in respectively the first direction (e.g. the X direction) and the direction opposite to the first direction. As shown in FIG. 14, according to an embodiment, the filling base region 1014 is further not beyond pixels with predetermined distances $s_r$, $s_l$ from the pixel under filling 1012 in the line containing the pixel under filling 1012 in respectively the first direction and the direction opposite to the first direction. According to an embodiment,. According to another embodiment, the predetermined distances $r_r$, $r_l$, $r_u$ and $r_d$ equal to at least 1 line. In addition, the filling base region 1014 is further not beyond a line with a predetermined distance $s_u$ from the line containing the pixel under filling 1012 in a second direction (e.g. the Y direction). According to an embodiment, the filling base region 1014 is further not beyond the line containing the pixel under filling 1012 in the direction opposite to the second direction. According to an embodiment, the predetermined distance $s_u$ is equal to at least 1 line. In the example shown on the top of the figure, the filling base region 1014 is bounded by the edge coordinates 1016 during the search for edge coordinates on both the first direction and the direction opposite to the first direction, and reaches up to the predetermined distance $s_u$ in the second direction and to the line containing the pixel under filling 1012 in the direction opposite to the second direction. Compared to the example shown on the top of FIG. 14, the filling base region 1014 shown on the bottom of the figure reaches up to the predetermined distance $s_r$ in the first direction.

Continuing the above description, according to an embodiment, the statistical information is obtained by performing a multi-stage voting method comprising obtaining a range of disparity levels that the highest number of pixels in the filling base region 1014 are associated with; and obtaining a disparity level in the range of disparity levels that the highest number of pixels in the filling base region 1014 are associated with. In the examples shown in FIG. 14, the highest number of pixels in the filling base region 1014 fall under a range of disparity levels from 45-49, and within the range of 45-49, the disparity level 47 has the top number of votes. Hence, the pixel under filling 1012 is filled with the disparity level 47.

In the foregoing embodiments, the occlusion-refining step S410 and the hole-filling step S412 improves the quality of the disparity map by using the edge coordinates of the first image as a guidance to identify pixels that need to be improved and to identify at least a pixel that may be used as a reference for fixing each pixel that needs to be improved. Therefore, the occlusion-refining step S410 and the hole-filling step S412 improve the quality of the disparity map without increasing the complexity of the computationally intensive disparity-estimating step S404. The occlusion-refining step S410 and the hole-filling step S412 may even help to reduce the complexity of the disparity-estimating step S404 by allowing using more compact representation of pixels such as in the embodiment involving the census-transforming step S502.

It is noted that the embodiments of the imaging method described above are only illustrative examples. Alternative equivalent implementations are possible. For example, the census-transforming step S502 may be performed region by region and included in the processing loop shown in FIG. 5; or the first and second estimated disparity maps, the set of occlusion pixels, the refined set of occlusion pixels and the first refined disparity map may be generated line by line as in the hardware pipelined embodiment described above.

The foregoing embodiments relate to an imaging system and method that generate a disparity map of a first image and a second image. Edge information of the first image is used as a guidance to identify regions on the disparity map that need improvement so that the quality of the disparity map is improved without increasing the complexity of the computationally intensive part such as disparity estimation. Refinement of the disparity map using the edge information may even reduce the complexity of disparity estimation. With the improved quality of the disparity map and controlled complexity, these embodiments may be suitable for applications such as 3D gesture recognition, view point synthesis and stereoscopic TV.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. An imaging system comprising:
an edge-detecting module configured to detect one or more edge coordinates of at least a reference line in a first image;
first and second disparity-estimating modules respectively configured to obtain a current line of a first estimated disparity map of the first image with respect to a second image and a second estimated disparity map of the second image with respect to the first image;
a cross-checking module configured to cross check the current line of the first estimated disparity map using the current line of the second estimated disparity map to identify a set of occlusion pixels in the current line of the first estimated disparity map;
an occlusion-refining module configured to refine the set of occlusion pixels to create a refined set of occlusion pixels; and
a hole-filling module configured to fill the refined set of occlusion pixels in the current line of the first estimated disparity map to obtain a current line of a first refined disparity map, wherein the first disparity-estimating module comprises
a first cost-aggregating module comprising a first aggregation window buffer and being configured to
obtain correlation lines of the first image and the second image,
calculate current matching costs of the correlation line of the first image with respect to the correlation line of the second image for a plurality of disparity distances,
aggregate matching costs using the first aggregation window buffer and the current matching costs for the plurality of disparity distances, and
update the first aggregation window buffer with the current matching costs; and
a first disparity-selecting module configured to select, respectively for each pixel on a current line of a first estimated disparity map, one of the disparity distances as a disparity level at the pixel of the first estimated disparity map.

2. The imaging system according to claim 1, wherein the occlusion-refining module comprises a refining base buffer configured to:
refine the set of occlusion pixels by identifying a pixel under refinement on the current line of the first estimated disparity map as occluded based on the number of occlusion pixels in a refining base region not beyond the nearest edge coordinates to the pixel under refinement in the current line of the first estimated disparity map in respectively a first direction and the direction opposite to the first direction, edge coordinates corresponding to a portion of the current line of the first estimated disparity map in the refining base region, and the current line of the first estimated disparity map in the direction opposite to the second direction using the refining base buffer and the current line of the first estimated disparity map containing the set of occlusion pixels, and
update the refining base buffer with the current line of first estimated disparity map containing the set of occlusion pixels or the refined set of occlusion pixels and information related to the detected one or more edge coordinates of the reference line of the first image.

3. The imaging system according to claim 1, wherein the hole-filling module is configured to fill the refined set of occlusion pixels in the current line of the first estimated disparity map based on at least a respective nearby pixel of each occlusion pixel.

4. The imaging system according to claim 1, wherein the refining base region is not beyond a line with a predetermined distance from the current line of the first estimated disparity map in the second direction.

5. The imaging system according to claim 1, wherein the hole-filling module comprises a filling base buffer, and is configured to:
fill the refined set of occlusion pixels in the current line of the first estimated disparity map by filling a pixel under filling in the refined set of occlusion pixels based on statistical information of disparity levels of pixels in a filling base region not beyond the nearest edge coordinates to the pixel under filling in the current line of the first estimated disparity map in respectively in the first direction and the direction opposite to the first direction, and the current line of the first estimated disparity map in the direction opposite to the second direction to obtain the current line of the first refined disparity map using the filling base buffer and the current line of the first estimated disparity map containing the refined set of occlusion pixels, and
update the filling base buffer with the current line of the first refined disparity map.

6. The imaging system according to claim 5, wherein the filling base region is not beyond a line with a predetermined distance from the current line of the first estimated disparity map in the second direction.

7. The imaging system according to claim 1, wherein the first disparity-estimating module further comprises a first census-transforming module comprising a first census buffer and being configured to use the first census buffer and a current line of the first image to produce the correlation line of the first image, which is census transformed, and to update the first census buffer with the current line of the first image, wherein each census-transformed pixel of the correlation line of the first image is represented by a bit vector length of at least 1.

8. The imaging system according to claim 1, wherein the first disparity-estimating module is configured to obtain a disparity level on the first estimated disparity map by:
calculating and aggregating matching costs of a reference window overlapping with a reference pixel in the first image and a plurality of candidate matching windows each overlapping with a respective candidate matching pixel in the second image, wherein each candidate matching pixel has a different disparity distance with respect to the reference pixel; and
selecting the disparity distance corresponding to one of the candidate matching pixels as a disparity level at the coordinate of the reference pixel on the first estimated disparity map.

9. The imaging system according to claim 8, wherein the disparity-estimating module is further configured to perform a census transform on the first image, wherein each census-transformed pixel of the correlation line of the first image is represented by a bit vector length of at least 1.

10. The imaging system according to claim 1, further comprising a computing device configured to execute the modules.

11. A computer system comprising:
one or more memories storing program routines comprising:
an edge-detecting module configured to detect edge coordinates in a first image;
first and second disparity-estimating modules respectively configured to obtain a first estimated disparity map of the first image relative to a second image and a second estimated disparity map of the second image relative to the first image;
a cross-checking module configured to cross check the first estimated disparity map using the second estimated disparity map to identify a set of occlusion pixels in the first estimated disparity map;
an occlusion-refining module configured to refine the set of occlusion pixels to create a refined set of occlusion pixels; and
a hole-filling module configured to fill the refined set of occlusion pixels in the current line of the first estimated disparity map to obtain a current line of a first refined disparity map; and
one or more processing units coupled to the one or more memories for controlling the execution of the program routines, wherein the first disparity-estimating module comprises
a first cost-aggregating module comprising a first aggregation window buffer and being configured to
obtain correlation lines of the first image and the second image,
calculate current matching costs of the correlation line of the first image with respect to the correlation line of the second image for a distances,
aggregate matching costs using the first aggregation window buffer and the current matching costs for the plurality of disparity distances, and
update the first aggregation window buffer with the current matching costs; and
a first disparity-selecting module configured to select, respectively for each pixel on a current line of a first estimated disparity map, one of the disparity distances as a disparity level at the pixel of the first estimated disparity map.

12. The computer system according to claim 11, wherein the occlusion-refining module is configured to refine the set of occlusion pixels by identifying at least a pixel under refinement on the first estimated disparity map as occluded based on the number of occlusion pixels in a refining base region not beyond the nearest edge coordinates to the pixel under refinement in a line containing the pixel under refinement in respectively a first direction and the direction opposite to the first direction, and edge coordinates corresponding to a portion of the line containing the pixel under refinement in the refining base region in respectively a second direction and a direction opposite to the second direction.

13. The computer system according to claim 11, wherein the hole-filling module is configured to fill the refined set of occlusion pixels based on at least a respective nearby pixel of each occlusion pixel.

14. The computer system according to claim 12, wherein the refining base region is not beyond the line containing the pixel under refinement in the direction opposite to the second direction.

15. The computer system according to claim 12, wherein the refining base region is further not beyond a line with a predetermined distance from the line containing the pixel under refinement in the second direction.

16. The computer system according to claim 11, wherein the hole-filling module fills a pixel under filling in the refined set of occlusion pixels based on statistical information of disparity levels of pixels in a filling base region not beyond the nearest edge coordinates to the pixel under filling in a line containing the pixel under filling in respectively in the first direction and the direction opposite to the first direction.

17. The computer system according to claim 16, wherein the filling base region is not beyond a line with a predetermined distance from the line containing the pixel under filling in the second direction.

18. An imaging method comprising:
provides, by one or more cameras, a first and a second image;
detecting, by a processing unit, edge coordinates in the first image;
obtaining a first estimated disparity map of the first image relative to the second image and a second estimated disparity map of the second image relative to the first image;
cross-checking the first estimated disparity map using the second estimated disparity map to identify a set of occlusion pixels in the first estimated disparity map;
refining the set of occlusion pixels to create a refined' set of occlusion pixels; and
filling the refined set of occlusion pixels in the current line of the first estimated disparity map to obtain a current line of a first refined disparity map, wherein obtaining a first estimated disparity map comprises obtaining a disparity level on the first estimated disparity map by calculating and aggregating matching costs of a reference window overlapping with a reference pixel in the first image and a plurality of candidate matching windows each overlapping with a respective candidate matching pixel in the second image, wherein each candidate matching pixel has a different disparity distance with respect to the reference pixel; and
selecting the disparity distance corresponding to one of the candidate matching pixels as a disparity level at the coordinate of the reference pixel on the first estimated disparity map.

19. The imaging method according to claim 18, wherein refining the set of occlusion pixels comprises identifying a pixel under refinement on the first estimated disparity map as occluded based on the number of occlusion pixels in a refining base region not beyond the nearest edge coordinates to the pixel under refinement in a line containing the pixel under refinement in respectively a first direction and the direction opposite to the first direction, and edge coordinates corresponding to a portion of the line containing the pixel under refinement in the refining base region in respectively a second direction and a direction opposite to the second direction.

20. The imaging method according to claim 18, wherein filling the refined set of occlusion pixels is based on at least a respective nearby pixel of each occlusion pixel.

21. The imaging method according to claim 19, wherein the refining base region is not beyond the line containing the pixel under refinement in the direction opposite to the second direction.

22. The imaging method according to claim 19, wherein the refining base region is not beyond a line with a predetermined distance from the line containing the pixel under refinement in the second direction.

23. The imaging method according to claim 18, wherein filling the refined set of occlusion pixels comprises filing a pixel under filling in the refined set of occlusion pixels based on statistical information of disparity levels of pixels in a filling base region not beyond the nearest edge coordinates to the pixel under filling in a line containing the pixel under filling in respectively in the first direction and the direction opposite to the first direction.

24. The imaging method according to claim 23, wherein the filling base region is not beyond a line with a predetermined distance from the line containing the pixel under filling in the second direction.

25. The imaging method according to claim 18, wherein obtaining a first estimated disparity map further comprises performing a census transform on the first image, wherein each census-transformed pixel of the first image is represented by a bit vector length of at least 1.

26. A non-transitory computer-readable medium having stored therein instructions which, when executed by a process, performs the imaging method according to claim 18.

27. An imaging system comprising:
means for providing a first and a second image;
means for detecting edge coordinates in the first image;
means for obtaining a first estimated disparity map of the first image relative to the second image and a second estimated disparity map of the second image relative to the first image;
means for cross-checking the first estimated disparity map using the second estimated disparity map to identify a set of occlusion pixels in the first estimated disparity map;
means for refining the set of occlusion pixels to create a refined set of occlusion pixels; and
means for filling the refined set of occlusion pixels in the current line of the first estimated disparity map to obtain a current line of a first refined disparity map, wherein the means for obtaining a first estimated disparity map comprises
a first cost-aggregating module comprising a first aggregation window buffer and being configured to
obtain correlation lines of the first image and the second image,
calculate current matching costs of the correlation line of the first image with respect to the correlation line of the second image for a plurality of disparity distances
aggregate matching costs using the first aggregation window buffer and the current matching costs for the plurality of disparity distances, and
update the first aggregation window buffer with the current matching costs; and
a first disparity-selecting module configured to select, respectively for each pixel on a current line of a first estimated disparity map, one of the disparity distances as a disparity level at the pixel of the first estimated disparity map.

* * * * *